United States Patent
Pazdirek et al.

[11] Patent Number: 6,116,113
[45] Date of Patent: Sep. 12, 2000

[54] COMPOSITE LINK

[75] Inventors: Jiri V. Pazdirek, Schaumburg; Ernst Matthew Gaertner, Arlington Heights; Michael T. Burzawa, Harwood Heights, all of Ill.

[73] Assignee: MacLean-Fogg Company, Wheeling, Ill.

[21] Appl. No.: 08/910,373

[22] Filed: Aug. 13, 1997

[51] Int. Cl.[7] .............................. G05G 1/00; F16L 11/12
[52] U.S. Cl. .......................... 74/579 R; 74/586; 174/47; 57/230
[58] Field of Search .................. 74/579 R, 586, 74/594, 579 E; 174/47, 211, 216, 209; 57/230

[56] References Cited

U.S. PATENT DOCUMENTS

| | | |
|---|---|---|
| 369,883 | 9/1887 | Richards ............................ 74/579 R |
| 2,602,766 | 7/1952 | Francis . |
| 2,970,186 | 1/1961 | Von Platen . |
| 3,014,088 | 12/1961 | Austin et al. . |
| 3,328,515 | 6/1967 | Vose . |
| 3,571,492 | 3/1971 | Clark . |
| 3,592,959 | 7/1971 | Dougherty . |
| 4,183,261 | 1/1980 | Eiselbrecher et al. ................. 74/579 R |
| 4,198,538 | 4/1980 | Lusk . |
| 4,202,382 | 5/1980 | Westhead .............................. 57/230 X |
| 4,491,687 | 1/1985 | Kaczerginski et al. . |
| 4,671,336 | 6/1987 | Anahara et al. . |
| 4,958,049 | 9/1990 | Alfieri et al. . |
| 4,992,313 | 2/1991 | Shobert et al. . |
| 5,374,780 | 12/1994 | Pazdirek . |
| 5,406,033 | 4/1995 | Pazdirek .............................. 57/230 X |
| 5,845,476 | 12/1998 | Kolmes ................................ 57/230 X |

FOREIGN PATENT DOCUMENTS

1074367   7/1967   United Kingdom .

*Primary Examiner*—David A. Bucci
*Assistant Examiner*—Colby Hansen
*Attorney, Agent, or Firm*—Brinks Hofer Gilson & Lione

[57] ABSTRACT

A composite link includes a fiberglass body. The body is formed by coating glass fibers with a liquid resin and winding the fibers around a plurality of end pieces or bushings. The end pieces have transition sections for smoothly changing the shape of the composite link and the path of the fibers. The fibers are wound in two layers, a first extending longitudinally of the body and the second transversely and around the first. A shield layer is placed over the fiberglass body.

17 Claims, 6 Drawing Sheets

COMPOSITE LINK

FIELD OF THE INVENTION

This invention relates in general to a link. More particularly, it relates to an improved composite fiber link, such as a suspension link.

BACKGROUND OF THE INVENTION

Links, such as suspension links, are used to connect two components together. In automotive uses, links are often used in the suspension structure The links typically allow the connected components to move along one axis relative to each other.

One type of known link is a one piece cast or forged metal link. Each end of the link includes a hollow cylinder. The axes through the centers of the hollow cylinders are parallel to each other. The cylinders are connected by a circular rod or tube. A cylindrical rubber insert is press fitted within each hollow cylinder. Within each insert is a hollow metallic bushing.

The link may also be made of three metal tubes welded together. Two of the tubes make up the hollow cylinders and the last tube is used as the connecting piece.

The link is connected to other components by a bolt. The bolt is placed through one prong of a fork or yoke on the component. The bolt is then placed through the bushing. The bolt is also placed through another fork or yoke on the component. Finally, a nut is tightened onto the bolt to hold the link.

The parallel bushings allow the components at each end of the link to rotate about one axis. The rubber inserts allow limited angular and lateral motion. The rubber inserts also isolate and cushion vibrations and shocks. Thus, vibrations and shocks are isolated from one end of the link to the other.

There are a number of problems associated with these links. Since the link is metallic, the links add substantial weight to a car. Increased weight results in decreased gas mileage. Additionally, the forging, casting or welding add cost to the link.

SUMMARY OF INVENTION

The objective of the present invention is to provide an improved link, avoiding the above problems.

In one embodiment, a composite link is provided. A connecting rod has a first cross-sectional shape. At least one end piece is adjacent to the connecting rod. The end piece has first and second ends where the first end has a second cross-section shape that substantially conforms to the first cross-section shape and the second end has a third cross-section shape that is different than the second cross-section shape. A fiber is wound around the second end, over a portion of the first end and over a portion of the connecting rod.

In another embodiment of the composite link, a center section has a first cross-section shape. At least a first end piece has at least a first recessed surface, a second cross-section shape that is different than the first cross-section shape and that includes the first recessed surface, and a transition section. The transition section has a second cross-section shape that substantially conforms to the first cross-section shape at a first end and a third cross-section shape that substantially conforms to the first recessed surface at a second end. A fiber is wound over a portion of the first recessed surface, over a portion of the transition section and over a portion of the center section.

In yet another embodiment of the invention, a composite link is provided. A first fiber is wound with a high pitch angle at least around a center portion of the link from adjacent a first end to adjacent a second end of the center portion. A second fiber is then wound with a low pitch angle around said first fiber.

BRIEF DESCRIPTION OF THE DRAWINGS

The invention, including its construction and method of operation, together with additional objects and advantages thereof, is illustrated in the following drawings in which.

DESCRIPTION OF THE PREFERRED EMBODIMENTS

Figures 1, 2:
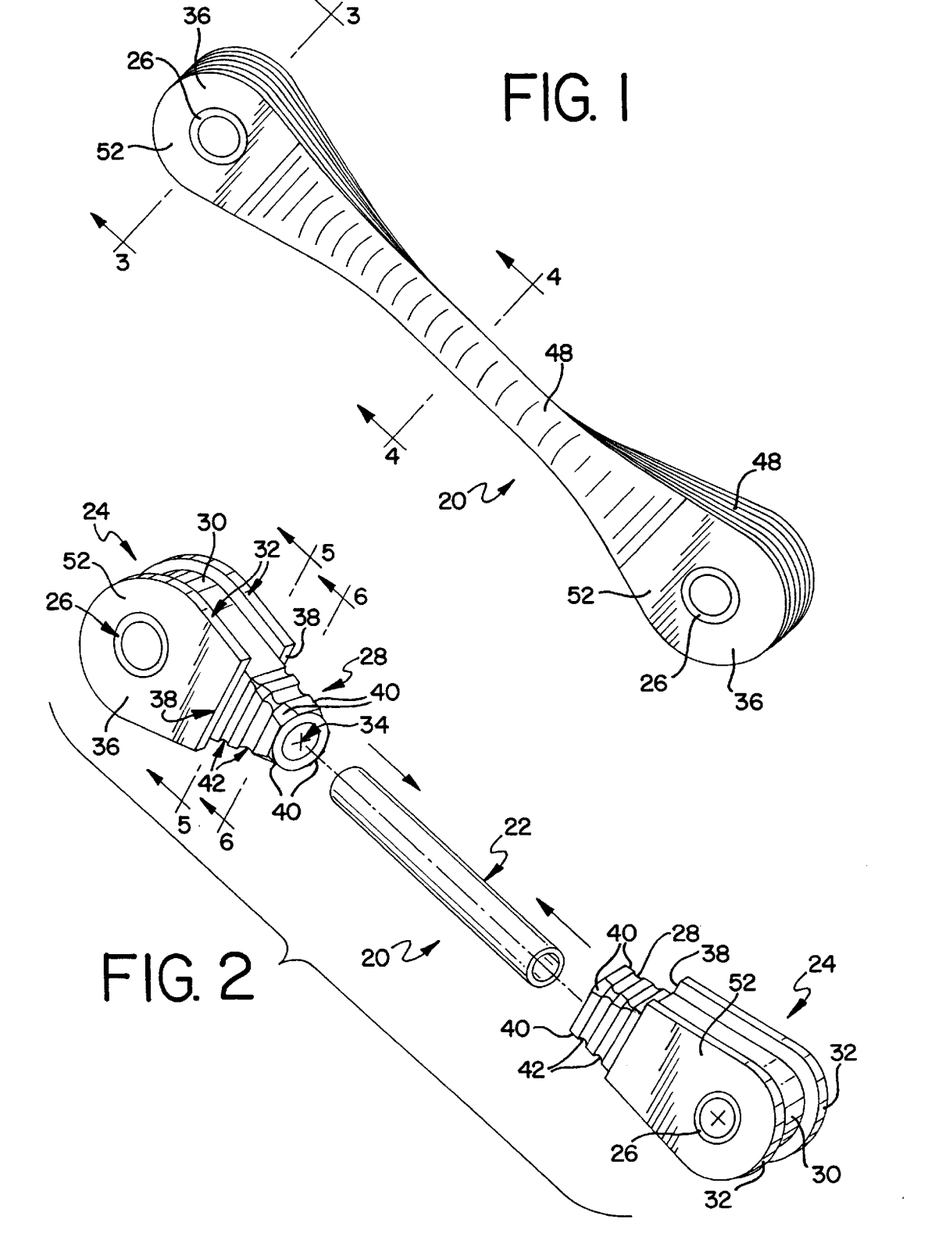
FIG. 1 is a perspective view of a composite link embodying features of the present invention.
FIG. 2 is a perspective view of some of the components of the composite link of FIG. 1.

FIG. 1 illustrates a composite link 20 embodying features of the present invention. The composite link 20 is capable of use as a suspension link or as an insulator, as disclosed in U.S. Pat. No. 5,406,033, the disclosure of which is incorporated herein by reference. For use as an insulator, weathersheds are molded onto the composite link 20. They are not shown here.

Figure 3:
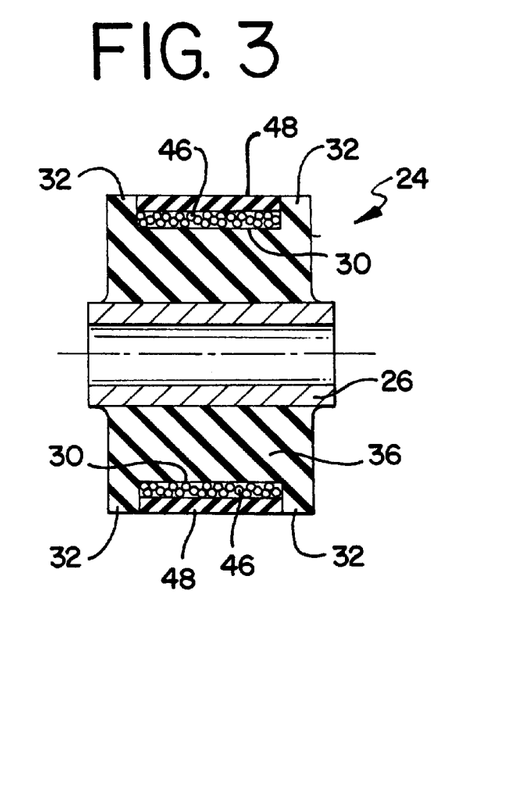
FIG. 3 is a cross-sectional view of the composite link of FIG. 1 along line A—A.
Figure 4:
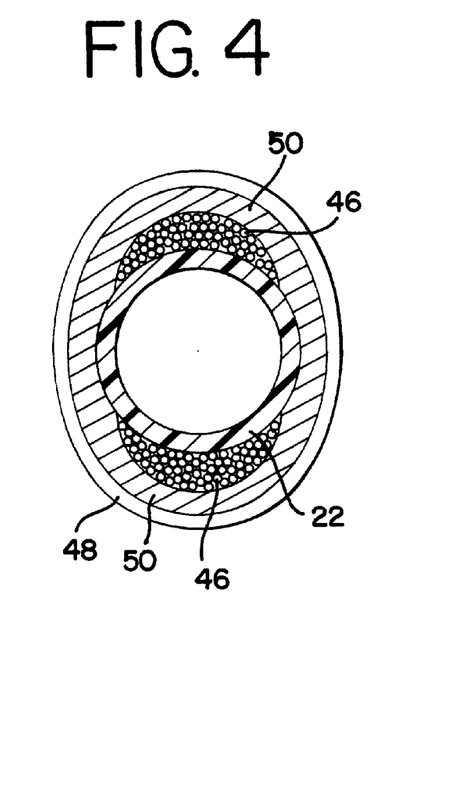
FIG. 4 is an enlarged cross-sectional view of the composite link of FIG. 1 along line B—B.

Referring to FIGS. 2–4, the composite link 20 includes a connecting rod 22 and two fittings or end pieces 24. The connecting rod 22 is shown straight here but may be either straight or bent. The connecting rod 22 is preferably formed of tubular pultruded fiberglass for higher load requirements and tubular extruded polymer for lower load requirements. Thus, the connecting rod 22 has a circular cross-section. Other materials, such as aluminum or magnesium, may be used for the connecting rod 22. The connecting rod 22 may also have other cross-sectional shapes, such as C-shaped, or in I-beam or solid cylinder form.

Each end piece 24 is illustrated here as being of the same construction as the other end piece. 24, However, the end pieces 24 may be of different constructions. Each end piece 24 includes a bushing 26 in an a outer section 36. Preferably, the bushing 26 is cylindrical and formed of a metal, such as steel or aluminum. Adjacent the end section is transition section 28.

The outer section 36 includes 28, a recessed surface 30, and flanges 32. The transition section 28 includes a connecting rod recess 34. Preferably, the outer section 36 and transition section 28 are molded of an elastomer, such as rubber, polyurethane or other elastic material. The outer section 36 is molded around the bushing 26. Before molding, an adhesive is applied to the bushing 26. The adhesive maintains the bushing 26 within the outer section 36. As an alternative to molding the outer section 36 on the bushing 26, the bushing 26 may be press assembled into the pre-molded or formed outer section 36.

The recessed surface 30 is defined by the flanges 32. Each flange 32 extends outwardly from the recessed surface 30. The recessed surface 30 starts on one side, such as the top, of the outer section 36 adjacent the transition section 28 and curves around to an opposite side, such as the bottom, of the outer section 36 adjacent the transition section 28. Instead of curving around the outer section 36, the recessed surface 30 may comprise a plurality of joined, substantially flat planar surfaces. The recessed surface 30 may also be rounded, grooved or have other surface texture. The recessed surface 30 preferably does not, but may, have portions that extend from the outer section 36 beyond the flanges 32.

The outer section 36 preferably also includes a step 38 on each side, adjacent the transition section 28. Preferably, each step 38 has the same thickness as that of the flanges 32, and has a height dimension approximately equal to the thickness of wound fibers, as discussed below.

Figure 5:
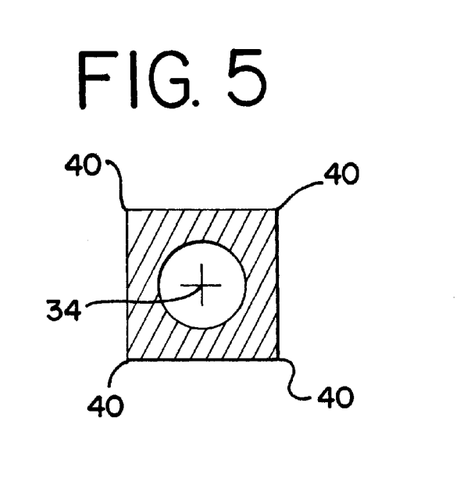
FIG. 5 is a cross-sectional view of the end piece component of FIG. 2 along line C—C.

The steps 38 and recessed surface 30 form a conceptual connection with the transition section 28. As shown in FIG. 5, the cross-section of the transition section 28 adjacent to the steps 38 (both sides) and recessed surface 30 (top and bottom) is rectangular. Preferably, the transition section 28 is flush with the recessed surface 30, and the steps 38 extend beyond the transition section 28 from the outer section 36. Thus, two edges of the rectangular cross-section at 5—5 in FIG. 2 are flush with the two recess surfaces 30 shown in FIG. 3. Other cross-sectional shapes for the transition section 28 are possible, such as square or rounded.

Figure 6:
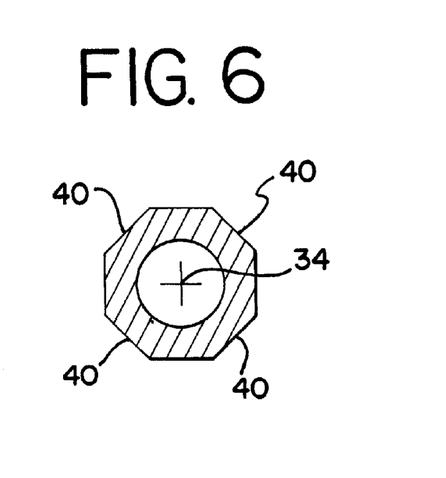
FIG. 6 is a cross-sectional view of the end piece component of FIG. 2 along line D—D.

Referring to FIGS. 2, 5 and 6, the transition section 28 contains the connecting rod recess 34. The connecting rod recess 34 is at one end of the end piece 24. The connecting rod recess 34 is shaped to receive and enclose a portion of the connecting rod 22, such as an end of the rod. Thus, the connecting rod recess 34 is preferably circular. Other recess 34 shapes are possible, such as rectangular for accepting a rectangular or an I-beam cross-sectional connecting rod 22, for example. The connecting rod recess 34 is preferably 3/4 or 1 inch deep, but other dimensions are possible. Preferably, the connecting rod 22 slides into the connecting rod recess 34, but it may tightly fit into the connecting rod recess 34.

On the end of the transition section 28 which has the connecting rod recess 34, at line 6—6 (in FIG. 2) on of the transition section 28, shown at D—D in FIG. 6, conforms with the cross-section of the connecting rod 22. As shown in FIG. 6, the cross-section here is rectangular, with radiused or chamfered corners 40. The radiused or chamfered corners 40 conform the outer section 36 to the circular connecting rod 22. The amount of radius or chamfering of the corners 40 increases from the conceptual junction with the steps 38 and recessed surface 30 to the end of the outer section 36 with the connecting rod recess 34. Thus, the transition section 28 gradually changes from the recessed surface 30 or cross-section of FIG. 5, to the radiused or chamfered corners 40, or cross-section of FIG. 6. The transition section 28 provides a smooth transition from the shape of the recessed surface 30 to the shape of the connecting rod 22.

The transition section 28 also provides a smooth transition from the dimensions of the recessed surface 30 to the dimensions of the connecting rod 22. For example, the cross-section of FIG. 5 comprises a 3/4 inch by 3/4 inch rectangle and the cross-section of FIG. 6 comprises a 5/8 inch by 5/8 inch rectangle, with radiused or chamfered corners 40.

The transition section 28 has one or more grooves 42 encircling it. Preferably, two semi-circular grooves 42 extend transverse to the corners 40 and are evenly spaced along the transition section 28. The grooves 42 aid in attaching the end piece 24 to the connecting rod 22, as discussed below.

To assemble the composite link 20, the two end pieces 24 and the connecting rod 22 described above are positioned adjacent each other, as generally shown in FIG. 2. In particular, one end of the connecting rod 22 is placed within the connecting rod recess 34 of one end piece, and the other end of the connecting rod 22 is placed within the connecting rod recess 34 of the other end piece. The composite link 20 may include more than two end pieces ,however. For example, a connecting rod 22 with a fork on one or both ends is used. An end piece 24 is placed on each of the forks or ends of the connecting rod 22 in such case.

Figure 7:
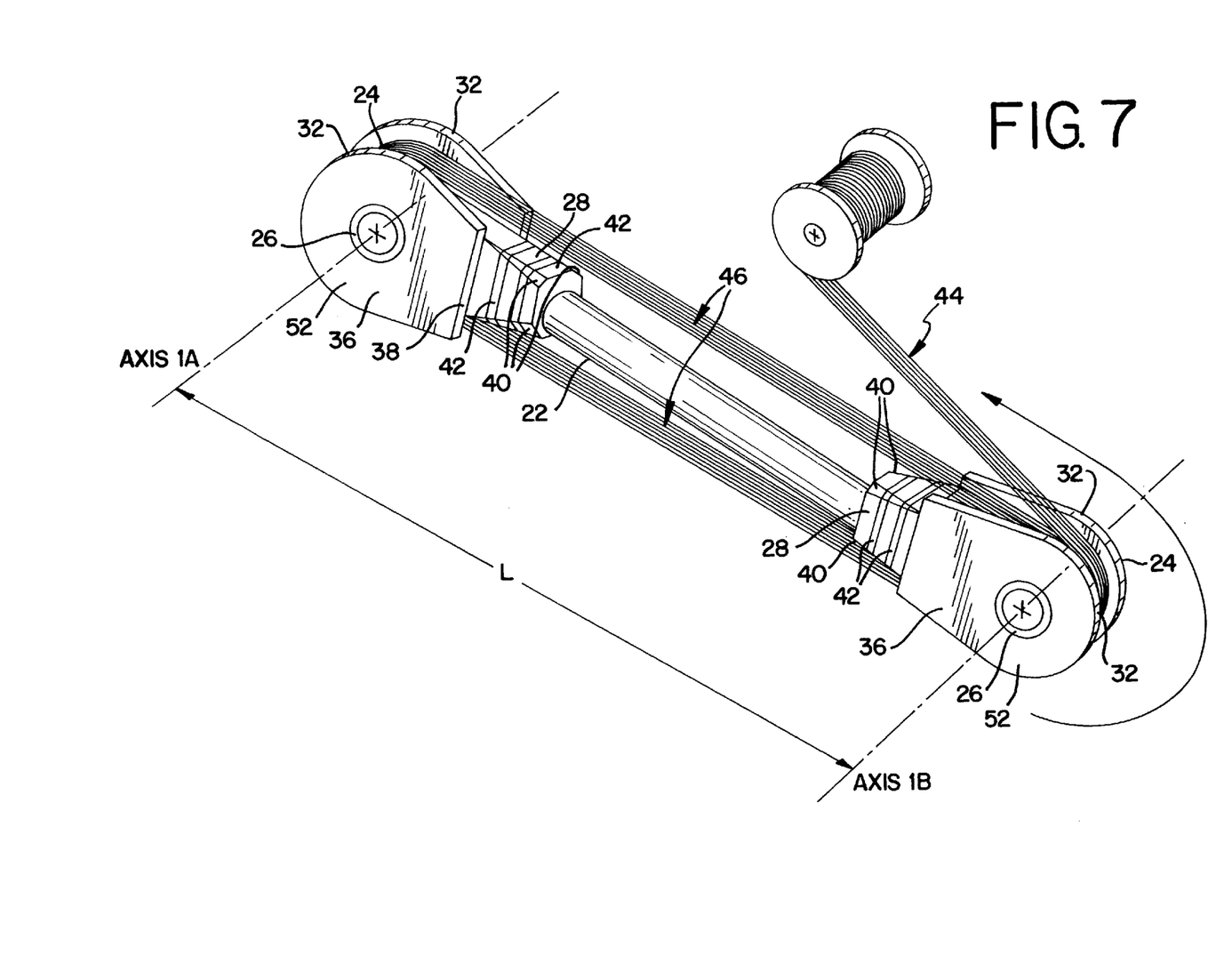
FIG. 7 illustrates one step in the method of winding the fibers of the link shown in FIG. 1.
Figures 8, 8A, 8B:
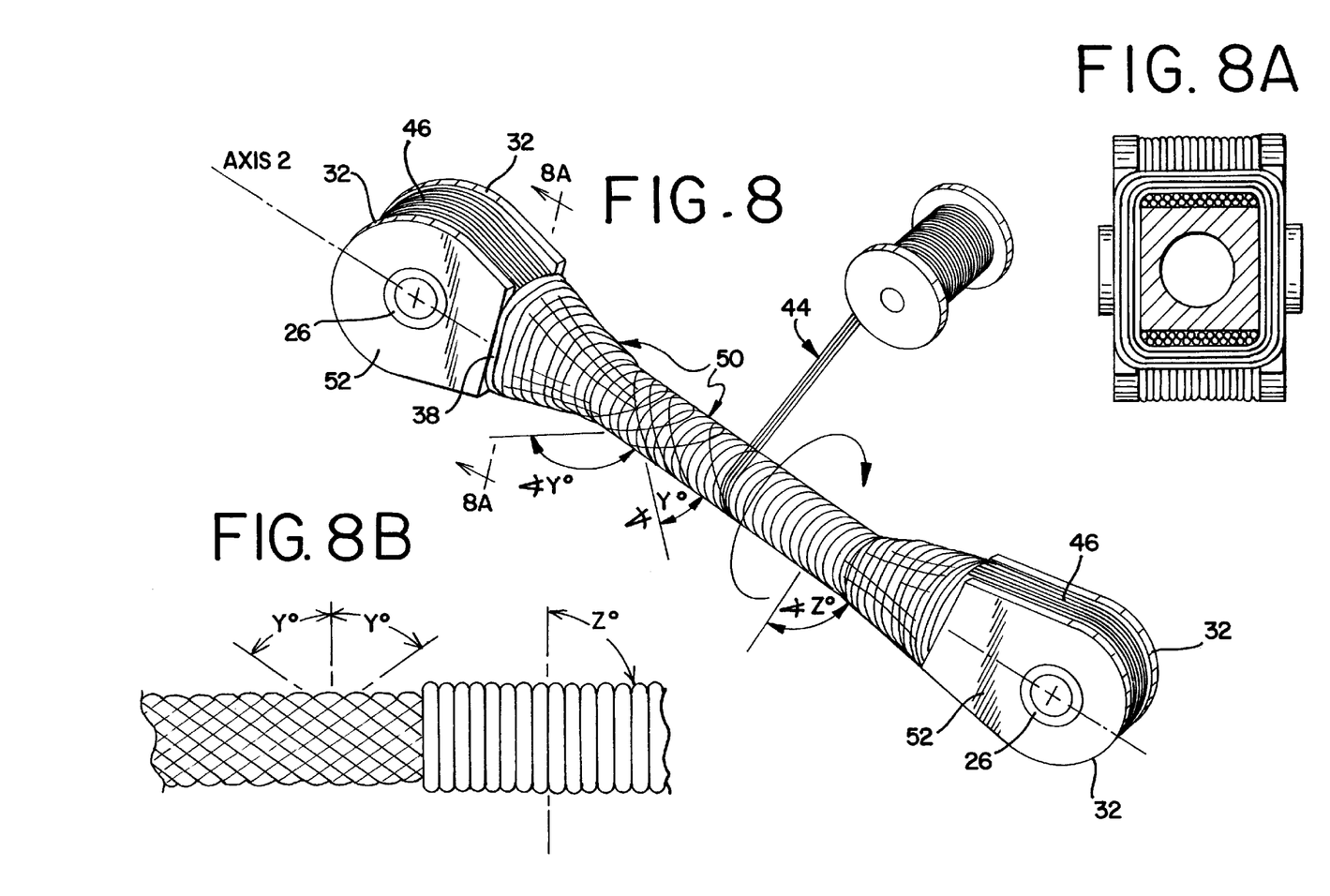
FIG. 8 illustrates another step in the method of winding the fibers of the link shown in FIG. 1.
FIG. 8A is a sectional view taken along line 8A—8A of FIG. 8.
FIG. 8B is a side view of the winding step shown in FIG. 8, showing files winding angles.

Referring to FIGS. 7 and 8, along with the connecting rod 22 and end pieces 24, the composite link 20 further includes at least one winding of one or more strands of fibers 44. Preferably, the fibers 44 are glass fibers, but other fibers, such as carbon (graphite), polymer (aramid) or combination fibers, may be used. Although a variety of glass fibers would be suitable, the preferred fiber is "E-glass". "E-glass" is an inexpensive, electrical grade fiber having high mechanical strength. While FIG. 7 shows multiple fibers 44, the fibers 44 may alternatively comprise a single fiber or a crosswoven tape of fibers 44.

The composite link 20 is made by winding the fibers 44 after resin coating. Generally, the fibers 44 are wound longitudinally between and around the end pieces 24. The longitudinal winding forms a primary layer 46 of resin coated fibers 44 and joins the end pieces 24 together as an integral part of the composite link 20. As shown in FIG. 8, the same continuous fibers 44 are then wound transversely around the primary layer 46 to form a secondary layer 50 of fibers 44. Alternatively, a different strand or strands of fiber 44 is used for any portion of the primary or secondary layers.

These winding steps are carried out using a known winding method. For a discussion of filament winding technology, including a listing of patents related thereto, reference is made to Filament Winding, a book by Peters, Humphrey and Foral, published by SAMPE, the Society of Advanced Materials and Process Engineers.

Referring to FIGS. 7 and 8, 8A, 8B details of the winding of the fibers 44 for the composite link 20 are illustrated. Initially, the end pieces 24 are secured in the relative positions shown in FIG. 7 and 8 by a fixture (not shown). The end pieces 24 are aligned axially and spaced apart. The distance L from the axis 1A of the bushing 26 to the axis 1B of the other bushing 26 represents an approximate length of the composite link 20. The fixture secures the end pieces 24 by connection to the bushings 26, and allows some relative movement of the end pieces 24 during fabrication of the composite link 20. The side surfaces 52 of the end pieces 24 defined by the flanges 32, the steps 38, and the ends of the bushings 26, are preferably covered by the fixture or other means during winding. The covering prevents the surfaces 52 and ends of the bushings 26 from being fouled with resin during winding as described below.

According to the invention, the continuous strand of fibers 44 is "wetted" in a controlled manner in a liquid resin bath (not shown). For example, the fibers 44 are coated with a polyester, vinylester, epoxy, phenolic, thermoplastic polymer or other material having similar properties. The resin must provide a good mechanical bond and be suitable for high temperature molding, painting, or dipping to create the shield layer 48 shown in FIGS. 1, 3 and 4. Preferably, vinylester is used. The preferred ratio of glass fiber to resin is approximately seventy percent to thirty percent. Other ratios may be used depending on the desired tensile strength. The resin migrates through the fibers 44 to connect the individual fibers 44. In the alternative, the fibers 44 may be pre-impregnated by conventional techniques.

The fibers 44, after resin coating, are repetitively wound from one end piece 24 to and around the other end piece 24, forming a loop of fibers 44. The fibers 44 are wound until the fibers 44 cover the recessed surfaces 30 of each end piece 24 across the recessed surface's 30 entire width, as shown in FIG. 3. This longitudinal winding of the fibers 44 forms the primary layer 46 to a thickness approximately ½ the height of the flanges 32 above the recessed surface 30. Where the composite link 20 includes an odd number of end pieces, such as three, one of the end pieces preferably has higher flanges 32 and/or a wider recessed surface 30 to accommodate the additional windings of fibers 44 necessary to cover the two other end pieces 24 as discussed above.

FIGS. 8, 8B illustrates further winding of the fibers 44 to form the secondary layer 50. Preferably, the same fibers 44 used to form the primary layer 46 are wound as one continuous length to form the secondary layer 50. The fibers 44 are brought across the primary layer 46 from one of the end pieces 24 and then around the primary layer 46 between both end pieces 24. Preferably, the fibers 44 are wound in multiple passes from one end piece 24 to the other end piece 24. For example, the fibers 44 are loosely wound at a low pitch angle (z) of 10 degrees (or 170 degrees) to the axis 2 shown in FIGS. 8 and 8B in a first pass. Other angles may be used. During a second pass, the fibers 44 are tightly wound at a high pitch angle (z) of approximately 90 degrees to the axis 2. To tightly wind the fibers 44, the fibers 44 are pulled, in tension, against the primary layer 46 as the secondary layer 50 is wound. The tight winding draws the primary layer 46 inward from its original loop path around the end pieces 24 and squeezes air out of the primary layer 46. The tight winding also creates the shape of the composite link 20 shown in FIG. 1. Other angles, passes and varying tension may be used. For example, the number of passes is increased to increase the strength of the composite link 20.

During the second pass, multiple transverse windings of the fibers 44 are used to create a thicker secondary layer 50 adjacent each end piece 24. In particular, the fibers 44 are wound around the transition section 28 to a thickness close to the height of the step 38. The grooves 42 on the transition section 28 help hold the resin coated fibers 44 of the secondary layer 50 in place on the sloping transition section 28. The multiple transverse windings aid the load bearing properties of the composite link 20 and allow for a smooth transition from the side surfaces 52 to the shield layer 48 (see FIGS. 1 and 4). Multiple transverse winding of the fibers 44 may also be used along other portions of the connecting rod 22, such as a thicker winding at the center of the composite link 20.

As with winding the primary layer 46, the tension applied during winding of the secondary layer 50 applies force to the end pieces 24. The force holds the end pieces 24 adjacent to the connecting rod 22. The force may draw the end pieces 24 closer together, particularly if the connecting rod 22 is not inserted within the entire depth of each recess 34. The force also tends to compact the elastomeric material of the end pieces 24. The force applied by the fibers 44 holds the end pieces 24 as integral components of the composite link 20 by not allowing removal of the end pieces 24.

After the fibers 44 are wound to form the composite link 20, the liquid resin is allowed to hard cure. The hard cure further secures the end pieces 24 and connecting rod 22 together. If desired, the resin may be oven cured to accelerate the manufacturing process.

Turning to FIGS. 1, 3 and 4, the shield layer 48 is applied onto the composite link 20. The shield layer 48 is a layer of paint, a coating of dipping type material, or an injection molded coating. Preferably, epoxy paint is used. The type of material used for the shield layer 48 is based on the cost, aesthetics and the required protection from the environment. For injection molding, the material used is a polymer, such as silicone rubber. Injection molding is preferably used for creating an insulator from the composite link 20. The insulator is of the same construction only weathersheds are molded onto or with the shield layer 48.

The shield layer 48 is applied to completely cover the primary and secondary layers 46 and 50. A fixture, such as the fixture discussed above, covers the surfaces 52 and the exposed portion of the bushings 26 on each end piece 24. Thus, the fixture masks exposed portions of the end pieces 24 during this application, including the inner portions of the bushings 26. The shield layer 48 is either spray painted onto the composite link 20, or the composite link 20 is dipped into dip type liquid coating material. The shield layer 48 is then allowed to dry or harden. Preferably, the shield layer 48 is flush with the side surfaces 52 along the steps 38 and with the flanges 32 above the recessed surfaces 30 after drying or hardening. Other coating techniques may be used to form the shield layer.

For injection molding, a die is constructed so that the upper and lower mold sections engage and mask the exposed faces, such as surfaces 52 and bushings 26. A retractable connecting rod is inserted within each bushing 26 before the mold sections are closed. The connection rod masks the inner portions of the bushings 26, unless the composite link 20 is created for use as an insulator. Silicone rubber is then injected in a conventional manner through ports to form the shield layer 30. Although injection molding is used in the aforedescribed example, other molding techniques might also be used, as well as other molding materials.

Figure 9:
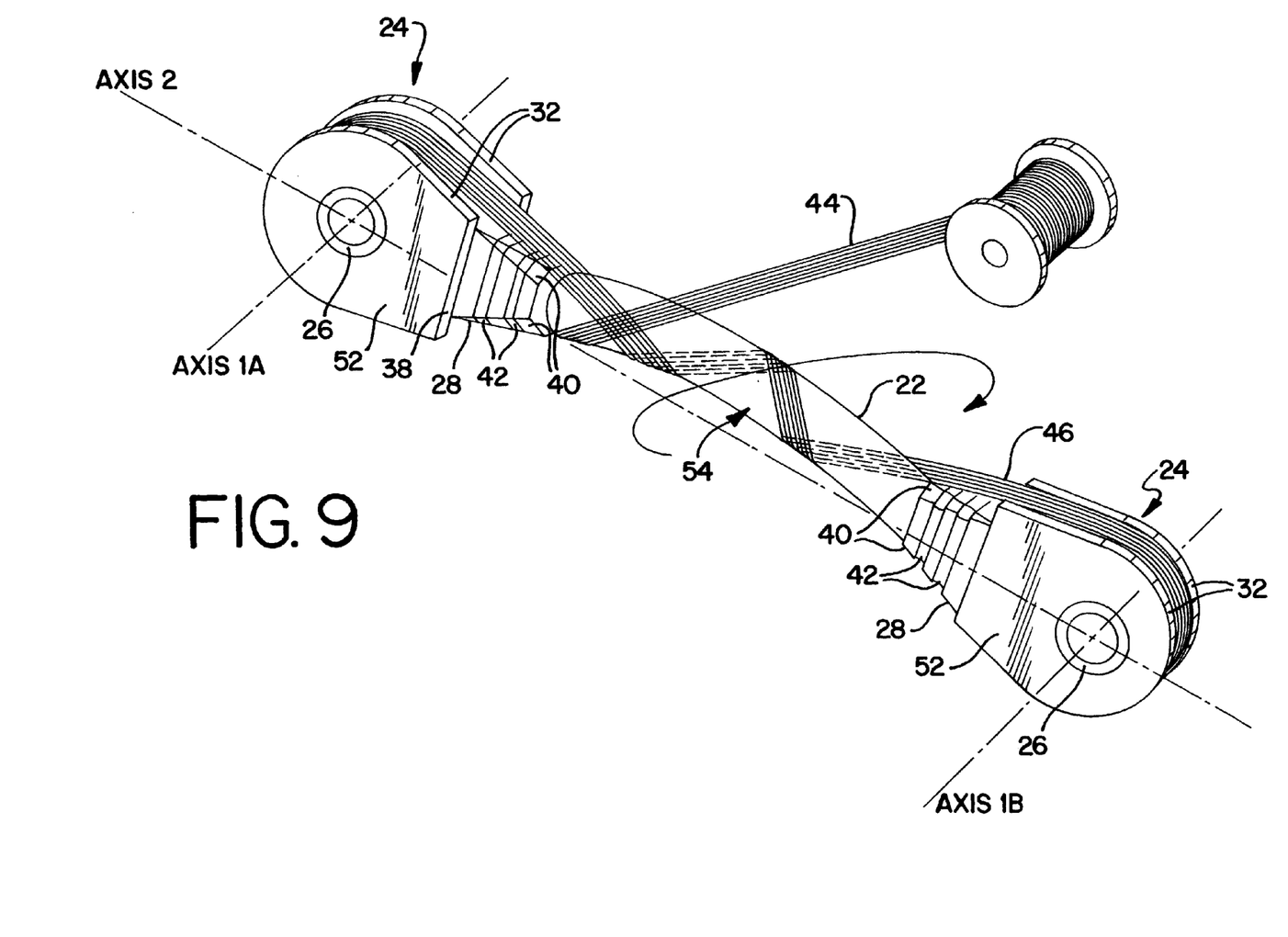
FIG. 9 is a perspective view of a composite insulator with a bent connecting rod and a winding of fiber.

Referring to FIG. 9, an alternative connecting rod 22 is shown. The connecting rod 22 has a bend 54 along axis 2. The connecting rod recesses 34 are preferably angled into the end pieces 24 in accordance with the degree of the bend 54. Alternatively, the ends of the connecting rod 22 for insertion into each connecting rod recess 34 are angled so as to be parallel with the axis 2. Other distortions of the connecting rod 22, including the ends or other portions of the connecting rod 22, are possible.

With the bend 54, the fibers 44 are preferably wound in a different way then discussed above to form the primary layer 46. The fibers 44 are repetitively wound from one end piece 24 to and around the other end piece 24. However, instead of forming the loop of fibers 44, the fibers 44 are spiral wound between the end pieces 24, as shown. Like the winding of fibers 44 discussed above with respect to FIGS. 7 and 8, the fibers 44 are wound until the fibers 44 cover the recessed surfaces 30 of each end piece 24 across the recessed surface's 30 entire width, as shown in FIG. 3. The secondary layer 50 is also formed as discussed above.

Figure 10A:
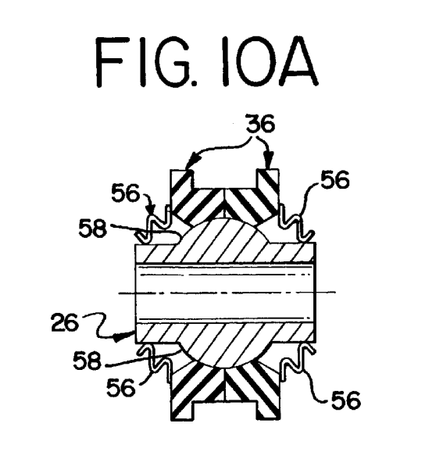
FIG. 10A is a cross-sectional view of an end piece with a spherical bushing.
Figure 10B:
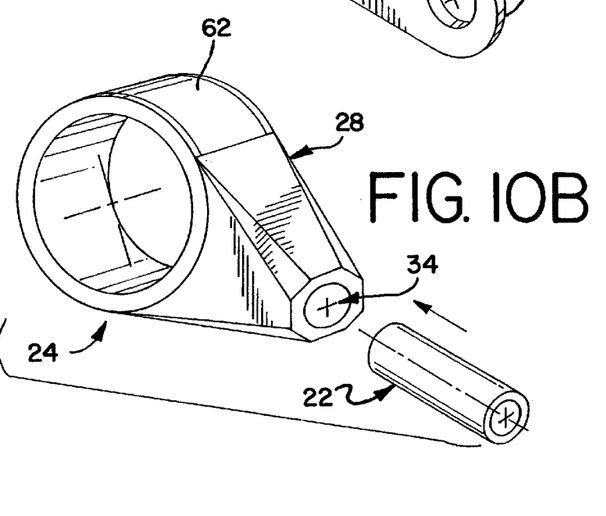
FIG. 10B is a perspective view of an end piece with a separate cylinder and transition section.
Figure 10C:
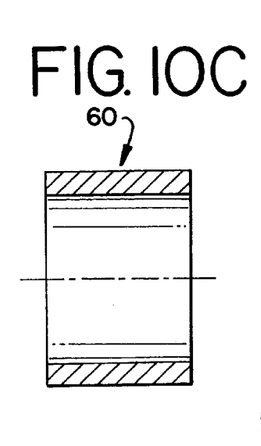
FIGS. 10C and 10D are cross-sectional views of two alternative cylinders for the end piece of FIG. 10B.
Figure 10D:
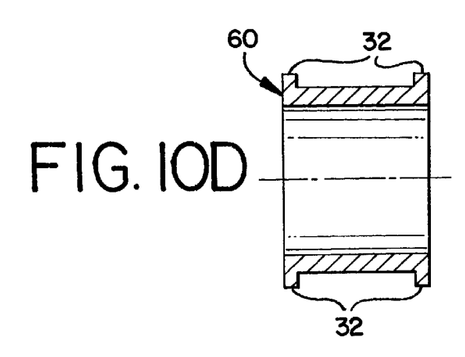
Figure 10E:
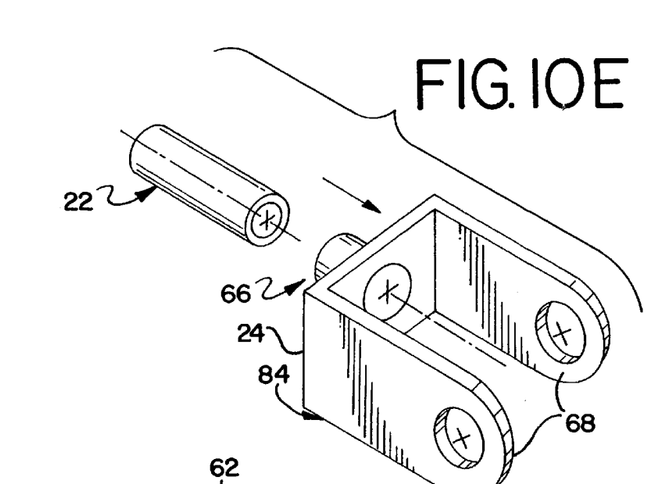
FIG. 10E is a perspective view of a yoke end piece.

Referring to FIGS. 10–10E, several alternative end pieces 24 are shown. In FIG. 10A, the bushing 26 is a spherical bushing with a spherical bearing joint 58. The bushing 26 is steel, aluminum, high strength fiber-reinforced polymer molding or other materials. The outer section 36 is either one piece as discussed above or is divided into two pieces as shown. The two pieces fit together for form the recessed surface 30. Also as shown, the outer section 36 is tapered towards the bushing 26. The tapered portion of the outer section 36 and the exposed outward face of the bushing 26 are covered by conventional dust covers 56. As known in the art, the dust covers 56 protect the spherical bearing joint 58.

In FIGS. 10B–10D, another alternative end piece 24 is shown. The end piece 24 includes a cylinder section 60 and a transition section 28. However, the transition section 28 and the cylinder section 60 are two different pieces. The cylinder section 60 comprises a large bushing, such as a metal bushing. As shown in the alternative cross-sections, the cylinder section 60 may have flanges 32.

The transition section 28 is preferably a metal piece, but other materials may be used. The transition section 28 is generally the same as the transition section 28 discussed above, but may not have the grooves 42. Additionally, the transition section 28 in this alternative embodiment may have prongs 62 that extend from the transition section 28. The prongs 62 are shaped to fit around a portion of the cylinder section 60 to hold the transition section 28 adjacent to the cylinder section 60. Alternatively and preferably, the transition section 28 is glued with adhesive to the cylinder section 60. Both the prongs 62 and adhesive may be used to connect the cylinder section 60 and the transition section 28. The transition section 28 joins the cylinder section 60 and the connecting rod 22 as discussed above.

For the alternative embodiment shown in FIG. 10B, a rubber insert (not shown) with a bushing is press fitted into the cylinder section 60, in a manner known in the art. The fibers 44 are wound around the cylinder section 60 so that the rubber insert may be removed. However, the fibers 44 hold the end pieces 24 adjacent the connecting rod as discussed above.

In FIG. 10E, another alternative end piece 24 is shown. The end piece 24 comprises a yoke 64. The yoke 64 includes a sleeve 66. The sleeve 66 press fits or slides into or over the connecting rod 22. Preferably, the sleeve 66 is round or otherwise has a cross-section conforming to the cross-sectional shape of the connecting rod 22. An additional transition section 28 may be added over the sleeve 66 or connecting rod 22. The fibers 44 are wound around the yoke 64 between the arms 68. If a transition section 28 is used, the transition section 28 provides a smoother transition from the yoke 64 to the connecting rod 22 as discussed above.

Any of the end pieces 24 described above or other end pieces 24 are used on the composite link 20. All the end pieces 24 on any given composite link 20 may be the same type of end piece 24 or different types of end pieces 24. For example, one end piece as shown in FIG. 10C is used with an end piece shown in FIG. 2.

As yet another alternative, the composite link 20 is formed without the connecting rod 22. The transition section 28 of each of the end pieces 24 transitions from the recessed surface 30 to the eventual shape of the center of the composite link 20, such as circular. The center of the composite link 20, or the section between the end pieces 24, comprises the primary and secondary layers 46 and 50 of fibers 44. The center section is formed by winding the fibers 44. The center section is preferably circular in cross-section, such as a hollow cylinder.

The composite link 20 without the connecting rod 22 is created by holding the end pieces 24 in a spaced apart relationship while the primary layer 46 of fibers 44 are wound around and between the end pieces 24. The secondary layer 50 of fibers 44 is wound around the primary layer 46 as discussed above. The tension of the secondary layer 50 may be changed so that a hollow area within the center section and inside the secondary layer 50 is formed.

While preferred embodiments of the invention have been described, it should be understood that the invention is not limited to these embodiments, and modifications may be made without departing from the invention. For example, a composite link may be made without a shield layer; the glass layers may be wound in an overlapping pattern rather than being wound concentrically; the second layer could be helical or crosswound; more than two layers could be included; or the strand is preferably continuous throughout the windings but could include several different strands. Therefore, the scope of the invention is defined by the appended claims, and all devices that come within the meaning of claims, either literally or by equivalence, are intended to be embraced therein.

We claim:

1. A composite link comprising:
   a) a rod;
   b) a first end piece adjacent said rod, said end piece comprising a sloping section and at least a first groove on said sloping section substantially transverse to said sloping section; and
   c) a fiber wound substantially parallel to said groove over said sloping section.

2. The link of claim 1 wherein:
   d) the first end piece comprises a step having a predetermined height adjacent said sloping section and wherein said fiber is wound adjacent said step to a thickness substantially the same as [a] the height of said step.

3. A composite link comprising:
   a) a rod;
   b) at least a first end piece adjacent said rod, said end piece comprising a step having a predetermined height;
   c) a first fiber wound over a portion of said rod and a portion of said first end piece; and
   d) a second fiber wound substantially transverse to said first fiber to a thickness substantially the same as the height of said step.

4. The link of claim 3 wherein:
   e) the first end piece further comprises a groove on a sloping portion adjacent said step and wherein said second fiber is wound substantially parallel to said groove on said sloping portion.

5. A composite link comprising:
   a) a connecting rod having a first cross-sectional shape;
   b) at least a first end piece adjacent said connecting rod comprising first and second ends;
   c) said first end comprising a section having a second cross-sectional shape substantially conforming to said first cross-sectional shape;

d) said second end comprising a section having a third cross-sectional shape different than said second cross-sectional shape;

e) a first fiber wound in a path around said second end, over a portion of said first end and over a portion of said connecting rod;

f) sa id first cross-sectional shape comprising a substantially round cross-sectional shape; and g) said second cross-sectional shape comprising a cross-sectional shape selected from the group consisting of radiused and chamfered rectangular cross-sectional shape.

6. A composite link comprising:

a) a connecting rod having a first cross-sectional shape;

b) at least a first end piece adjacent said connecting rod comprising first and second ends;

c) said first end comprising a section having a second cross-sectional shape substantially conforming to said first cross-sectional shape;

d) said second end comprising a section having a third cross-sectional shape different than said second cross-sectional shape;

e) a first fiber wound in a path around said second end, over a portion of said first end and over a portion of said connecting rod; and f) a second fiber wound around said first end and said rod.

7. The link of claim 6 wherein:

g) said second fiber comprises a first layer wound at a high pitch and a second layer wound at a low pitch.

8. The link of claim 6 wherein:

g) said first fiber and said second fiber comprise one continuous strand of fiber.

9. A composite link comprising:

a) a connecting rod having a first cross-sectional shape;

b) at least a first end piece adjacent said connecting rod comprising first and second ends;

c) said first end comprising a section having a second cross-sectional shape substantially conforming to said first cross-sectional shape;

d) said second end comprising a section having a third cross-sectional shape different than said second cross-sectional shape;

e) a first fiber wound in a path around said second end, over a portion of said first end and over a portion of said connecting rod; and f) said connecting rod including a bend and said first fiber being spiral wound around said bend.

10. A composite link comprising:

a) a rod having a round cross-sectional shape;

b) an end piece including a section having a first recessed surface, a second cross-sectional shape different from said round cross-sectional shape, and a transition section;

c) said transition section having a second cross-sectional shape substantially conformed to said round cross-sectional shape at a first end and a third cross-sectional shape substantially conformed to said first recessed surface at a second end; and d) a first fiber wound over a portion of said first recessed surface, over a portion of said transition section and over a portion of said rod;

e) said connecting rod being comprised of pultruded fiber;

f) said second cross-sectional shape of said transition section in said end piece comprising a rectangular shape wherein one side of said rectangular shape corresponds to said first substantially recessed surface;

g) said first end piece further comprising at least two flanges;

h) said transition section comprising a taper from said first end to said second end; and i) said first fiber being wound between said two flanges and along said taper.

11. A composite link comprising:

a) a center section having a first cross-sectional shape;

b) an end piece including a section having a first recessed surface, a second cross-sectional shape different from said first cross-sectional shape, and a transition section;

c) said transition section having a second cross-sectional shape substantially conformed to said first cross-sectional shape at a first end and a third cross-sectional shape substantially conformed to said first recessed surface at a second end; and d) a first fiber would over a portion of said first recessed surface, over a portion of said transition section and over a portion of said center section; and e) a second fiber wound transversely of the center section from adjacent said second end to a second fitting.

12. A composite link comprising:

a) an end piece comprising an outer elastomer and an inner bushing;

b) a portion of said link adjacent said end piece comprising at least a first fiber;

c) said first fiber being in partial contact with said outer elastomer and wound around said end piece; and d) said end piece comprising a transition from a substantially flat portion to said link portion.

13. A composite link comprising:

a) an end piece comprising an outer elastomer and an inner bushing;

b) a portion of said link adjacent said end piece comprising at least a first fiber;

c) said first fiber being in partial contact with said outer elastomer and wound around said end piece; and d) a second fiber wound substantially transverse to said first fiber and wherein said end piece comprises at least one groove substantially transverse to said first fiber.

14. A composite link comprising:

a) an end piece comprising an outer elastomer and an inner bushing;

b) a portion of said link adjacent said end piece comprising at least a first fiber;

c) said first fiber being in partial contact with said outer elastomer and wound around said end piece; and d) said end piece comprising a step having a predetermined height and wherein a second fiber is wound substantially transverse to said fiber adjacent to said step to a thickness conforming to the height of said step.

15. A composite link comprising:

a) a first fiber wound with a high pitch angle around a center portion of said link from adjacent a first end to adjacent a second end of said center portion ;

b) a second fiber wound with a low pitch angle around said first fiber;

c) said center portion including a third fiber wound longitudinally; and d) at least a first end piece, said third fiber being wound around said first end piece.

16. A composite link comprising:

a) a first fiber wound with a high pitch angle around a center portion of said link from adjacent a first end to adjacent a second end of said center portion;

b) a second fiber wound with a low pitch angle around said first fiber;

c) a connecting rod in said center portion between said first and second ends; and d) a first end piece adjacent said first end and a transition section between said first end piece and said rod.

17. The link of claim 16 wherein:

e) said first end piece comprises a step having a predetermined height and wherein said first fiber and said second fiber are wound adjacent said step to a thickness substantially the same as a height of said step.

* * * * *